United States Patent
Chati et al.

(10) Patent No.: US 7,731,821 B1
(45) Date of Patent: Jun. 8, 2010

(54) REDUCTION OF SULFUR-CONTAINING GASES DURING CONVERSION OF COAL INTO METALLURGICAL COKE

(75) Inventors: Harshrai Krishnarao Chati, Goa (IN); Gokuldas P. Kamat, Goa (IN); Peter Francis Xavier D'Lima, Goa (IN); Yong-Wu Kim, Schererville (IN)

(73) Assignee: Sesa Goa Limited (IN)

( * ) Notice: Subject to any disclaimer, the term of this patent is extended or adjusted under 35 U.S.C. 154(b) by 460 days.

(21) Appl. No.: 11/672,807

(22) Filed: Feb. 8, 2007

(51) Int. Cl.
*C10B 53/00* (2006.01)
*B05D 3/02* (2006.01)

(52) U.S. Cl. .................. 201/6; 264/122; 264/125; 427/376.1; 201/17

(58) Field of Classification Search .......... 201/6, 201/17, 24; 264/122, 125, 126; 427/376.1, 427/372.2
See application file for complete search history.

(56) References Cited

U.S. PATENT DOCUMENTS

| | | | | |
|---|---|---|---|---|
| 1,545,620 A | * | 7/1925 | Trent | 44/575 |
| 3,472,622 A | * | 10/1969 | Ridley | 423/461 |
| 3,661,719 A | * | 5/1972 | Kelmar | 201/17 |
| 3,971,654 A | * | 7/1976 | Mancke | 75/460 |
| 3,985,543 A | * | 10/1976 | Vlnaty et al. | 201/6 |
| 4,186,054 A | * | 1/1980 | Brayton et al. | 201/6 |
| 4,661,240 A | * | 4/1987 | Kessick et al. | 208/127 |
| 7,497,928 B2 | * | 3/2009 | Clark | 201/6 |

* cited by examiner

*Primary Examiner*—N. Bhat
(74) *Attorney, Agent, or Firm*—Banner & Witcoff, Ltd.

(57) ABSTRACT

A method of reducing sulfur-containing gases during conversion of a coal slab into metallurgical coke is disclosed. A sulfur-reducing agent is added to a coal slab, which may contain compacted coal aggregate. The coal slab, including the sulfur-reducing agent, is heated to produce metallurgical coke, which results in a reduced amount of sulfur-containing gases relative to an amount of sulfur-containing gases that would be produced by converting the coal slab into metallurgical coke without adding the sulfur-reducing agent to the coal slab before the coal slab is heated. The sulfur-reducing agent may be applied as a coating to the coal slab. The sulfur-reducing agent may include at least one of calcium carbonate, limestone, lime, magnesium carbonate, magnesium oxide, and the like.

10 Claims, 2 Drawing Sheets

REDUCTION OF SULFUR-CONTAINING GASES DURING CONVERSION OF COAL INTO METALLURGICAL COKE

BACKGROUND

Coke-making is a carbonization process of coal suitable as a reducing agent for iron oxide at elevated temperatures. The resultant carbonized material is called coke. To use coke for reducing iron oxide, certain physical, mechanical, and chemical properties are desirable. Both moisture and volatile hydrocarbons are removed from coal and unique mechanical and physical properties are formed. There are two types of conventional coke-making processes: (1) recovery coke-making, and (2) non-recovery coke-making. While the recovery coke-making process (all volatile hydrocarbons are recovered) has been a dominant process for the last fifty years, the cost of environmental controls and operations have made the process economically non-competitive. Since new non-recovery processes recover heat from burning the volatile hydrocarbons and convert it to power, these new non-recovery processes are now emerging as the main coke-making processes in the industry.

Conventional sulfur-reducing technologies related to conversion of coal into metallurgical coke can be classified into two general categories: (1) removal of sulfur in the coal before the coke oven, and (2) removal of sulfur-containing gases in the flue gas of the coke oven. Technologies belonging to the first category include floatation (selective floating of the sulfur-containing compounds) and coal washing. Technologies belonging to the second category include spraying chemical compounds into the flue gas and dry/wet scrubbing.

SUMMARY

Embodiments of the invention are directed to methods of reducing sulfur-containing gases during conversion of a coal slab into metallurgical coke. A sulfur-reducing agent is added to a coal slab, which may contain compacted coal aggregate. The coal slab, including the sulfur-reducing agent, is heated to produce metallurgical coke, which results in a reduced amount of sulfur-containing gases relative to an amount of sulfur-containing gases that would be produced by converting the coal slab into metallurgical coke without adding the sulfur-reducing agent to the coal slab before the coal slab is heated. The sulfur-reducing agent may be applied as a coating to the coal slab. The sulfur-reducing agent may include at least one of calcium carbonate, limestone, lime, magnesium carbonate, magnesium oxide, and the like.

Additional features and advantages of the invention will be apparent upon reviewing the following detailed description.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE INVENTION

Figure 1:
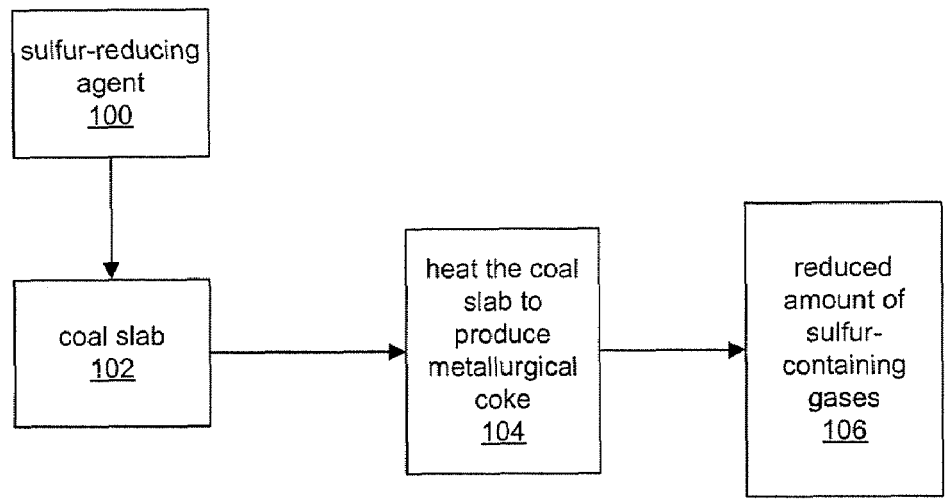
FIG. 1 is a flow diagram showing a process for reducing sulfur-containing gases during conversion of coal into metallurgical coke in accordance with embodiments of the invention.

Sulfur-containing gases such as $SO_2$, $H_2S$, $SO_3$, etc are generated during coke-making processes and are pollutants hazardous to the environment. Various government agencies throughout the world are limiting the amounts of these gases that are allowed to enter to the environment. Recently, the United States (U.S.) Environmental Protection Agency (EPA) has imposed limits on the total amount of these Sulfur-containing gases that may be emitted from a new plant to less than 40 tons per year.

The US EPA substantially reformed the PSD (Prevention of Significant Deterioration) program on Dec. 31, 2002. The reformed program modified PSD as it had been implemented pursuant to the 1977 Clean Air Act mandates and 1980 federal court decisions. This regulation became effective, for example, in the State of Michigan on Mar. 3, 2003. It requires major stationary sources and major modifications to undergo a new source review (NSR) and obtain a permit before construction. This federal NSR program is implemented under the PSD program by each state government.

The basic goals of the PSD program are: (1) to ensure that economic growth can continue while simultaneously preserving existing air quality (i.e., prevent degradation of an attainment area into a non-attainment area); and (2) to preserve and protect the air quality in areas of special natural recreational, scenic, or historic value, such as national parks and wilderness areas (i.e., Class I areas). The primary provisions of the PSD regulations are to ensure compliance with the NAAQS (National Ambient Air Quality Standards), the applicable PSD increment concentrations, and the requirement to apply BACT (Best Available Control Technology) on the project's emissions of air pollutants.

The PSD Program is different in the sense that unlike NAAQS significant threshold is determined by the total accumulated amount in a year. Accordingly, dilution of pollutants by air or other non-harmful gases over a period will not help meet this regulation. In the case of a new coke plant construction or a major modification of existing plant, this new regulation applies particularly to sulfur dioxide, nitrogen oxides, carbon monoxide, and particulate matter. The significant thresholds of these pollutants are shown in Table 1.

TABLE 1

Significant Threshold for Each Regulated NSR Pollutant
Significant Thresholds

| Pollutant | Quantity (TPY) |
|---|---|
| Sulfur Dioxide | 40 |
| Nitrogen Oxides | 40 |
| Carbon Monoxide | 100 |
| Particulate Matter (PM) | 25 |
| PM10 | 15 |
| Volatile Organic Compounds (VOCs) | 40 |
| Lead (Pb) | 0.6 |
| Asbestos | 0.007 |
| Beryllium | 0.0004 |
| Mercury | 0.1 |
| Vinyl Chloride | 1.0 |
| Fluorides | 3.0 |
| Sulfuric Acid Mist | 7.0 |
| Hydrogen Sulfide ($H_2S$) | 10 |
| Total Reduced Sulfur (including $H_2S$) | 10 |

TABLE 1-continued

Significant Threshold for Each Regulated NSR Pollutant
Significant Thresholds

| Pollutant | Quantity (TPY) |
|---|---|
| Municipal Waste Combustor Organics | 15 |
| Municipal Waste Combustor Acid Gases | 40 |
| Municipal Solid Waste Landfill NMOC | 50 |

Notice the stringent requirement for sulfur dioxide. Suppose a new coke plant has a capacity of 0.5 million tons per year, and the plant is using a low sulfur coal to produce coke as shown in Table 2.

TABLE 2

Chemistry of coal charge & coke
(unit, %)

|  | Moist | VM | Ash | FG | P | S |
|---|---|---|---|---|---|---|
| Coal | 7.33 | 22.15 | 8.60 | 69.25 | 0.026 | 0.62 |
| Coke | 3.68 | 1.26 | 11.48 | 87.26 | 0.03 | 0.68 |

The production of 0.5 million tons of coke requires 0.71 million tons of coal by using a conversion ratio of 1.42. The total amount of sulfur in the coal is 4,402 tons out of which 3,400 tons is retained in the coke. The difference of 1002 tons of sulfur will be emitted into the air mostly in the form of sulfur dioxide. This corresponds to roughly 2004 tons of sulfur dioxide. If modern wet scrubbing technology removes 95% of this amount, then 100 tons of sulfur dioxide is emitted into the air. This amount far exceeds the PSD limit of 40 tons per year. As such, in order to meet the PSD program, additional sulfur-removal techniques could be used.

Conventional sulfur-reducing techniques do not efficiently and economically meet the requirements of the PSD program. Sulfur-reducing techniques, in accordance with embodiments of the invention, not only significantly reduce sulfur-containing gases in the common flue tunnel, a conduit for exhaust gases, but also decrease the burning loss of coal during the coke-making process. Sulfur-reducing techniques, in accordance with embodiments of the invention, may be combined with commercially available wet-scrubbing technologies to facilitate economically meeting the pertinent U.S. EPA regulations.

Wet scrubbing is a gas cleaning technology through the use of liquid solutions to react or dissolve target compounds or particulate matter. Solutions may simply be water (for dust) or complex solutions of reagents that specifically target certain compounds. Removal efficiency of pollutants is improved by increasing residence time in the scrubber or by increasing the surface area of the scrubber solution through the use of sprays, packed towers, or a venturi. Text books on air-pollution-control technology typically describe wet scrubbing processes well. Therefore, a detailed discussion of those processes is not needed here.

Conventional methods for reducing the sulfur-containing gases during coke-making processes have typically been to absorb or react with such gases after the gases have been generated. Techniques in accordance with embodiments of the invention are directed to reacting with sulfur-containing gases, liquids, or solids during the coke-making process in-situ while coke is being made, thereby significantly reducing the desulphurizing cost and minimizing the leak potential of sulfur-containing gases.

FIG. 1 is a flow diagram showing a method of reducing sulfur-containing gases during conversion of a coal slab into metallurgical coke in accordance with embodiments of the invention. A sulfur-reducing agent 100 is added to a coal slab 102, which may contain compacted coal aggregate. The coal slab 102, including the sulfur-reducing agent 100, is heated to produce metallurgical coke as shown at 104, which results in a reduced amount of sulfur-containing gases, as shown at 106, relative to an amount of sulfur-containing gases that would be produced by converting the coal slab into metallurgical coke without adding the sulfur-reducing agent to the coal slab before the coal slab is heated.

In accordance with embodiments of the invention, in-situ desulfurization may be accomplished by applying a layer of desulfurizing material on the coking coal after top charging or on the compacted coal slab. Initial experiments have typically resulted in a 65-75% reduction of sulfur dioxide to the common tunnel. In this way, embodiments of the invention will advantageously allow for controlling sulfur-dioxide emissions such that PSD-Program limits may be met.

An optimal thickness of the sulfur-reducing coating depends upon the particular blend of the compacted coal slab. However, we found that a coating thickness between 1/200 and 1/50 of the slab thickness provides good results. For example, we applied a coating of 1 to 2 cm on a compacted coal slab with a thickness of 90 cm. This reduced sulfur dioxide content of the exhaust gas from 450 mg/Nm$^3$ to less than 100 mg/Nm$^3$.

Further, in accordance with embodiments of the invention, a sulfur-reducing agent may be applied as a coating to a coal slab, which contains compacted coal aggregate, thereby producing a burning loss less than 1%. For example, suppose coke is made from coal that has 28% of volatiles. Theoretically, 1 ton of coal should produce 0.72 tons of coke. However, a coke plants typically produce less than 0.7 tons of coke due to the burning of potential coke from coal. If the burning loss is less than 1%, this translates into a coke production of more than 0.71 ton. This means that for every 100 tons of coke, 1.4 tons of coal is saved. As such, the economic benefits are significant.

In accordance with embodiments of the invention, the sulfur-reducing coating itself may be porous. As such, one would not expect the coating to act as a barrier for air that oxidizes carbon. Apparently, the coating, after allowing the passage of volatile hydrocarbon, seals itself and becomes a barrier for air penetration.

Figure 2:
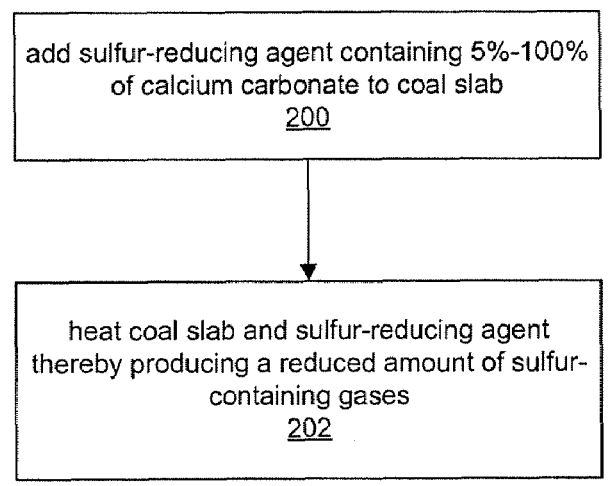
FIG. 2 is a flow chart showing steps of a process for reducing sulfur-containing gases during conversion of coal into metallurgical coke in accordance with embodiments of the invention.

FIG. 2 is a flow chart showing steps of a method of reducing sulfur-containing gases during conversion of a coal slab into metallurgical coke in accordance with embodiments of the invention. A sulfur-reducing agent is added to the coal slab before the coal slab is heated to convert the coal slab into metallurgical coke, wherein approximately 5% to 100% of the sulfur-reducing agent is calcium carbonate, as shown at step 200. The coal slab and the sulfur-reducing agent are heated to convert the coal slab into metallurgical coke thereby producing a reduced amount of sulfur-containing gases relative to an amount of sulfur-containing gases that would be produced by converting the coal slab into metallurgical coke without adding the sulfur-reducing agent to the coal slab before the coal slab is heated, as shown at step 202.

Figure 3:
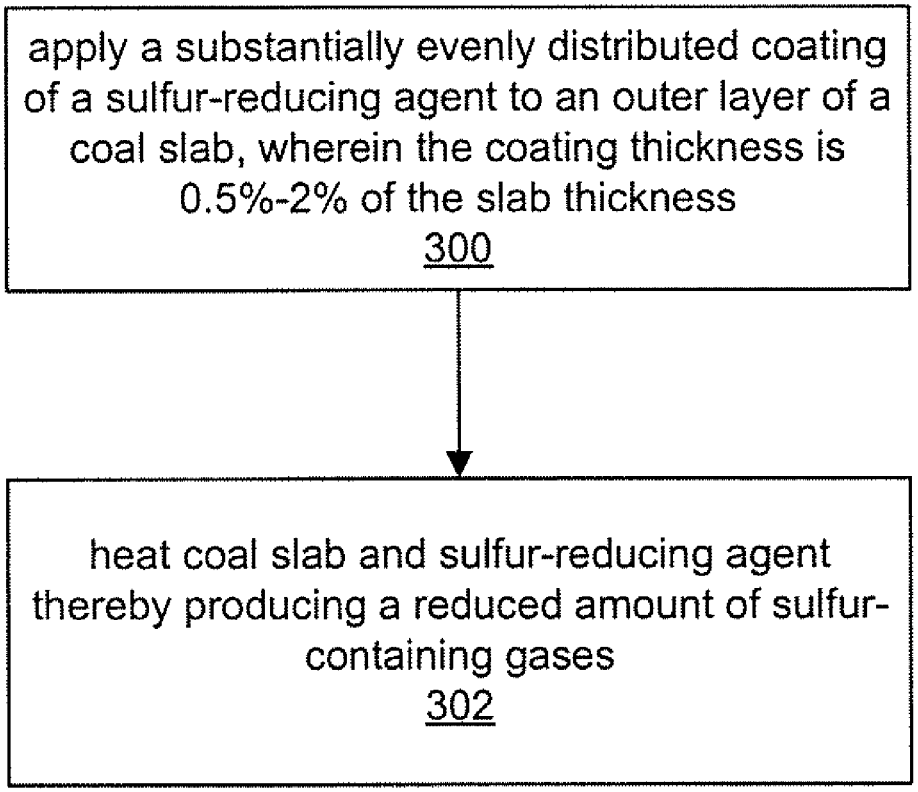
FIG. 3 is a flow chart showing steps of a process for reducing sulfur-containing gases during conversion of coal into metallurgical coke in accordance with embodiments of the invention.

FIG. 3 is a flow chart showing steps of a method of reducing sulfur-containing gases during conversion of a coal slab into metallurgical coke in accordance with embodiments of the invention. A substantially evenly distributed coating of a sulfur-reducing agent is applied to an outer layer of the coal slab, wherein the coal slab has a slab thickness and the substantially evenly distributed coating of the sulfur-reducing agent has a coating thickness that is between approximately 0.5% and 2% of the slab thickness, as shown at step 300. The coal slab and the sulfur-reducing agent are heated to convert the coal slab into metallurgical coke thereby producing a reduced amount of sulfur-containing gases relative to an amount of sulfur-containing gases that would be produced by converting the coal slab into metallurgical coke without applying the substantially evenly distributed coating of the sulfur-reducing agent to the coal slab before the coal slab is heated, as shown at step 302.

Embodiments of the invention advantageously result in low-cost overall sulfur removing technology, and a significant reduction of coal burning loss during coke-making relative to conventional techniques for reducing sulfur-containing gases during coke-making processes. For example, using wet-scrubbing techniques requires an initial investment to install a wet-scrubbing system. Suppose a 1-million ton-capacity coke plant requires a 20,000 ton-capacity wet scrubbing system. By incorporating in-situ defulfurization techniques, in accordance with embodiments of the invention, the wet-scrubbing capacity can be reduced to 10,000 tons (or less), thereby significantly lowering the cost of the wet scrubbing system. Likewise, the operating and maintenance cost will also be reduced.

Assuming a conservative estimate of a 50% reduction in sulfur-containing gases attributable to in-situ desulfurzation techniques, in accordance with embodiments of the invention, then the cost of the flue gas desulfurization equipment (FGD) equipment may be reduced from approximately $5 million to approximately $3.2 million (by a well-known chemical engineering plant design rule).

In accordance with embodiments of the invention, various coating-application methods, including, but not limited to, dry spray, wet spray, roll coating, and the like, may be used for applying a coating of sulfur-reducing material to a coal slab to be converted into metallurgical coke. The coating composition may include at least one of calcium carbonate, limestone, lime, magnesium carbonate, magnesium oxide, and the like, any of which may be crushed to an appropriate particle size, including, but not limited to, a particle size of less than approximately 6 millimeters.

Calcium carbonate ($CaCO_3$, one of its forms is popularly known as marble) will dissociate at temperatures above 1800 degrees Fahrenheit (which is less than the temperature of 1832 degrees Fahrenheit at which coke is typically made). As such, one would not expect calcium carbonate to perform well as a sulfur-reducing coating during coke-making processes. Nevertheless, both calcium oxide and calcium carbonate work well in various sulfur-reducing coating compositions. A sulfur-reducing agent, in accordance with various embodiments of the invention, may contain between 5% and 100% calcium carbonate.

What has been described above is merely illustrative of the application of the principles of the invention. Those skilled in the art can implement other arrangements and methods without departing from the spirit and scope of the invention.

We claim:

1. A method of reducing sulfur-containing gases during conversion of a coal slab, which includes compacted coal aggregate, into metallurgical coke, the method comprising:
    adding a sulfur-reducing agent to the coal slab before the coal slab is heated to convert the coal slab into metallurgical coke, wherein approximately 5% to 100% of the sulfur-reducing agent is calcium carbonate; and
    heating the coal slab and the sulfur-reducing agent to convert the coal slab into metallurgical coke thereby producing a reduced amount of sulfur-containing gases relative to an amount of sulfur-containing gases that would be produced by converting the coal slab into metallurgical coke without adding the sulfur-reducing agent to the coal slab before the coal slab is heated.

2. The method of claim 1, wherein the step of adding the sulfur-reducing agent further comprises: applying a substantially evenly distributed coating of the sulfur-reducing agent to an outer surface of the coal slab.

3. The method of claim 2, wherein the coal slab has a slab thickness and the substantially evenly distributed coating of the sulfur-reducing agent has a coating thickness that is between approximately 0.5% and 2% of the slab thickness.

4. A method of reducing sulfur-containing gases during conversion of a coal slab, which includes compacted coal aggregate, into metallurgical coke, the method comprising:
    applying a substantially evenly distributed coating of a sulfur-reducing agent to an outer layer of the coal slab, wherein the coal slab has a slab thickness and the substantially evenly distributed coating of the sulfur-reducing agent has a coating thickness that is between approximately 0.5% and 2% of the slab thickness; and
    heating the coal slab and the sulfur-reducing agent to convert the coal slab into metallurgical coke thereby producing a reduced amount of sulfur-containing gases relative to an amount of sulfur-containing gases that would be produced by converting the coal slab into metallurgical coke without applying the substantially evenly distributed coating of the sulfur-reducing agent to the coal slab before the coal slab is heated.

5. The method of claim 4, wherein the sulfur-reducing agent includes calcium carbonate.

6. The method of claim 4, wherein the sulfur-reducing agent includes calcium oxide.

7. The method of claim 4, wherein the sulfur-reducing agent includes magnesium oxide.

8. The method of claim 4, wherein the sulfur-reducing agent includes crushed limestone.

9. The method of claim 8, wherein the sulfur-reducing agent includes crushed lime.

10. The method of claim 4, wherein the sulfur-reducing agent includes crushed lime.

* * * * *